April 25, 1933.　　　　G. N. HEIN　　　　1,905,868
DRIVING MIRROR
Original Filed Oct. 2, 1926　　2 Sheets-Sheet 1
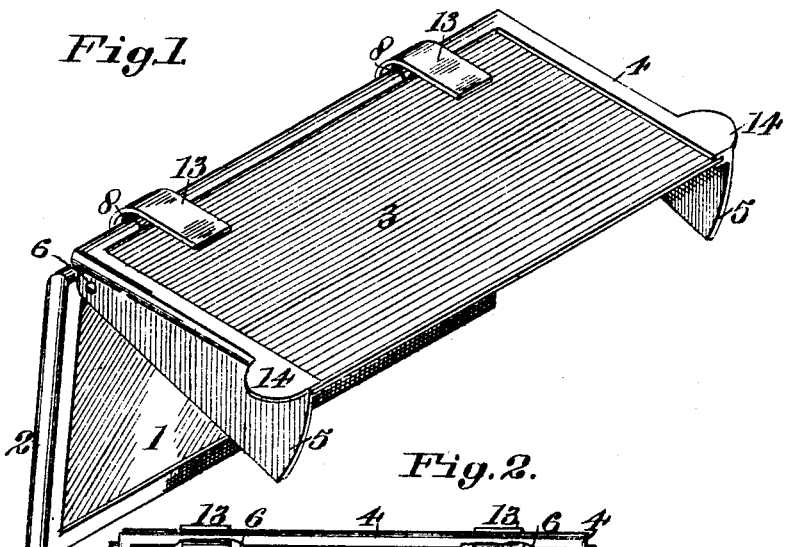
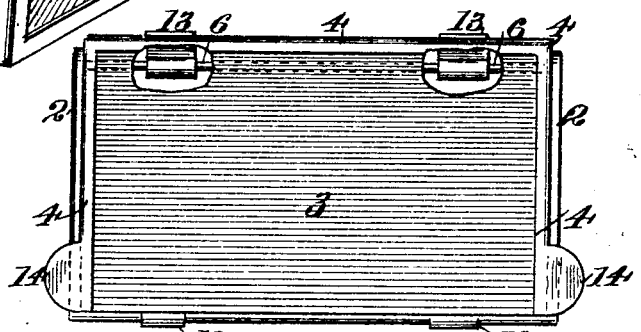
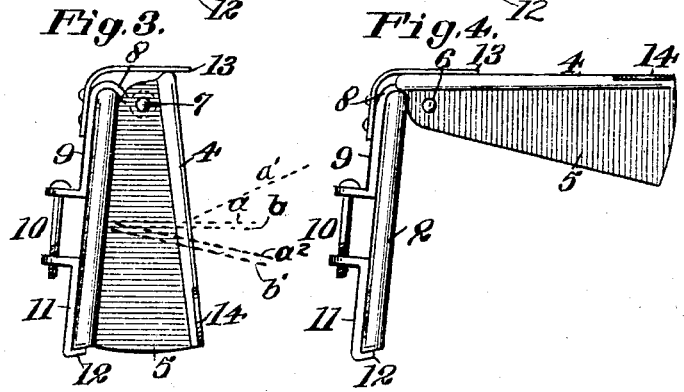
Inventor.
George N. Hein
By Harry A. Totten
Attorney.

April 25, 1933.   G. N. HEIN   1,905,868
DRIVING MIRROR

Original Filed Oct. 2, 1926   2 Sheets-Sheet 2

Inventor
George N. Hein
Attorney

Patented Apr. 25, 1933

1,905,868

UNITED STATES PATENT OFFICE

GEORGE N. HEIN, OF SAN FRANCISCO, CALIFORNIA

DRIVING MIRROR

Application filed October 2, 1926, Serial No. 139,061. Renewed August 3, 1928.

The present invention relates to improvements in driving mirrors especially adapted for use on a motor vehicle, to enable the driver thereof to see the roadway behind him, and of that type illustrated in my pending application—Serial Number 714,257, filed May 19th, 1924.

By the employment of the mirrors now in use, and with the same adjusted to afford a vision of the road in rear of the vehicle, the full glare if the headlights of a following vehicle or any other bright light in the rear, is reflected into the eyes of the operator and the object of my present invention is to overcome this annoying objection.

The invention comprises a transparent or semi-transparent and semi-reflecting screen for detachable connection with an adjustable mirror and capable of adjustment independently of the mirror, whereby the screen is capable of movement entirely out of the range of vision, so that full reflection is obtained from the mirror itself when desired, or of movement into functional position to reflect a portion of the light rays coming from the rear away from the driver's vision, or to absorb the same, or both, whereby the resulting light passing through the screen and reaching the eyes of the driver is not of sufficient intensity to cause annoyance, but is sufficiently clear to enable the driver to view clearly the image of objects behind him. The invention also comprises the provision of means for precluding side glare striking the mirror when the screen is in functional position and which means constitutes a stop for limiting the movement of the screen into functional position.

With this and other objects in view, the invention consists in the novel construction and combination of parts hereinafter described, illustrated in the accompanying drawings, and set forth in the claims hereto appended, it being understood that various changes in the form, proportion, size and minor details of construction, within the scope of said claims, may be resorted to without departing from the spirit, or sacrificing any of the advantages of the invention.

To more clearly comprehend the invention, reference is directed to the accompanying drawings, wherein—

Fig. 1 is a view in elevation of the preferred embodiment of my invention, with the screen in raised position to admit of an unobstructed reflection by the mirror.

Fig. 2 is a view in front elevation, illustrating the screen in functional position overlying the mirror.

Fig. 3 is a view in side elevation illustrating the means for attaching the screen to the mirror and the flanges for limiting the movement of the screen into functional position.

Fig. 4 is a view similar to Fig. 3, with the screen in elevated position.

Fig. 5 is a view in rear elevation of one of the attaching members.

Figure 6:
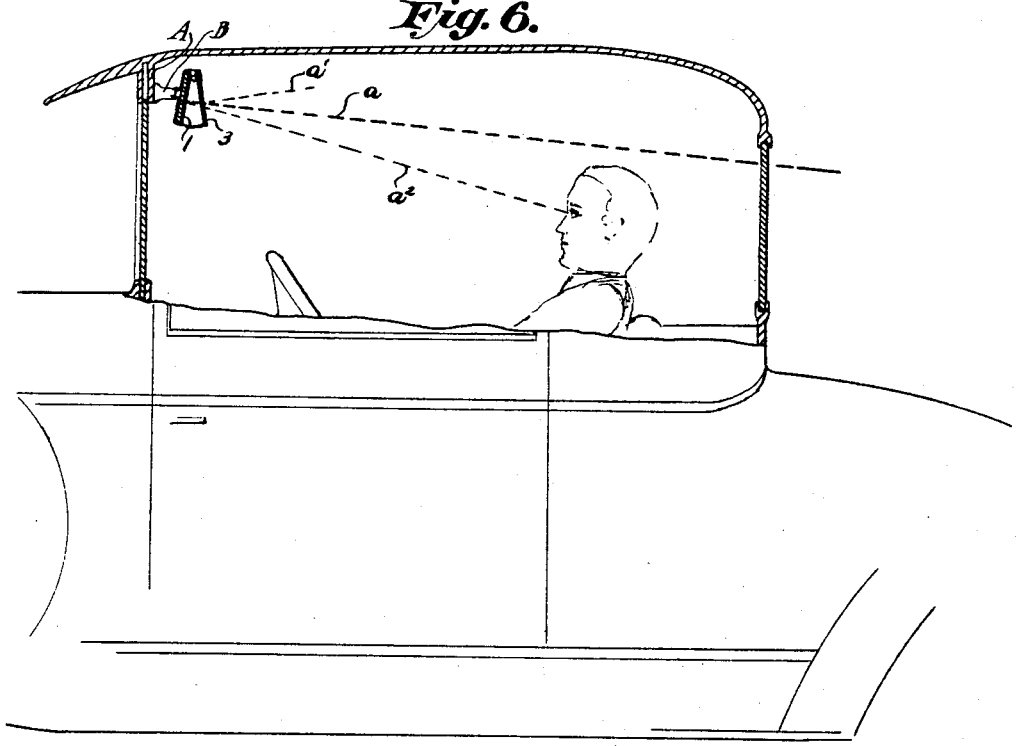
Fig. 6 is a fragmentary, sectional view of an automobile illustrating more clearly the utility and operation of the present invention.

The invention contemplates the provision of a screen or filter of a semi-transparent and semi-reflecting character, designed for being arranged at an angle with relation to the main reflective surface or mirror for intercepting a portion of the glaring light rays, such as are encountered in night driving, and reflecting the glare, at least in part, away from the driver's eyes so as not to annoy or interfere with his perfect control of the vehicle, while permitting the remainder of the light rays to filter through the screen and onto the mirror for being reflected for a useful purpose.

In the drawings, the reference numeral 1 designates a mirror of any ordinary construction, suitably mounted in a frame 2. The mirror is adapted for attachment to a support A, by any suitable and well known form of bracket construction B, which will admit of tilting movement of the mirror to enable it to be adjusted to different positions.

Removably associated with the mirror and capable of positioning to overlie the face thereof is a suitable semi-reflecting screen 3, preferably of transparent to semi-transparent material, capable of absorbing or reflecting, or both, a portion of the light rays falling upon it. For the purpose of the present invention, colored or smoked glass may be regarded as a typical material for said screen, although other materials, such for example as colored celluloid may be employed.

The screen 3 is mounted within a rectangular frame 4, rearwardly from the side walls of which extend flanges 5 which are substantially triangular in side elevation, and the free edges of which are adapted to contact with the front surface of the frame 2, when the screen is in functional position and limit the inward movement of the screen toward the mirror face. The flanges 5 also preclude, when the screen is in functional position, the admittance of light rays onto the mirror surface from the side.

To enable the pivoting of the screen 3 and its frame 4 from inoperative to functional position, a fulcrum 6 is provided between the upper end of each flange and the overhanging portion or eye 7 of a bracket member 8, which projects upwardly over and forwardly from the mirror frame 2.

The body portion 9 of the bracket is secured by any suitable means, such as an adjusting screw 10 with a portion 11 of said bracket, the end flange 12 of which engages beneath the bottom edge of the frame 2. Two of these attaching bracket constructions are employed, the same assuring a rigid detachable fastening means for securing the screen 3 to mirrors of various types.

To preclude undue free movement of the screen frame 4 on its fulcrum points 6, I provide leaf retaining springs 13, one secured to each bracket leg 9, with its free end coacting with the upper edge of the screen frame 4. The free ends of the respective springs 13 are adapted, when the screen is in functional position, to bear downwardly on the upper edge of the screen frame 4, and when the frame 4 is pivotally moved to inoperative position, to bear on the outer face of the screen frame 4 and hold the same in substantially right angle position, relative to the mirror surface.

The functional position of the screen 3 is clearly illustrated in Figs. 2 and 3, that is it is disposed at an angle to and in front of the mirror 1.

When in this position, the screen reflects a portion of the light away from the mirror 1 and the driver's eyes, and for this reason is preferably formed with a smooth and polished rear surface. It may also absorb a portion of the light, by reason of its color or other propriety, so that the remaining portion of the light which reaches the mirror 1 and is reflected thereby to the driver's eyes is sufficiently dimmed or reduced in intensity to prevent or materially reduce the annoying glare.

Although it is preferable to make the screen 3 of transparent or semi-transparent material, so that the image seen therethrough will be true, but reduced in brilliance, it should be understood that a translucent material may be employed, if desired, the latter giving a diffused or blurred image. Such image while preventing the driver from distinguishing objects of dark color, will, however, enable him to determine and recognize the relative position of another vehicle approaching from the rear.

When there is no glaring light in the rear, or when driving in the day time, the screen 3 may be easily and quickly moved out of functional position, to the position shown in Figs. 1 and 4, finger grip pieces 14 being provided on the ends of the frame 4 to facilitate this movement.

Figure 7:
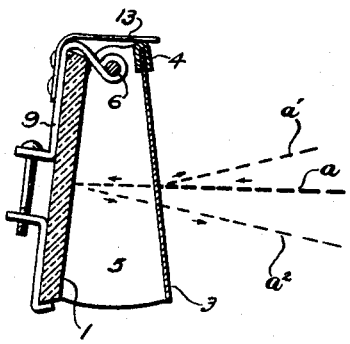
Fig. 7 is a vertical, sectional view through the improved rear view mirror with the screen arranged in its operative position.
Figure 8:
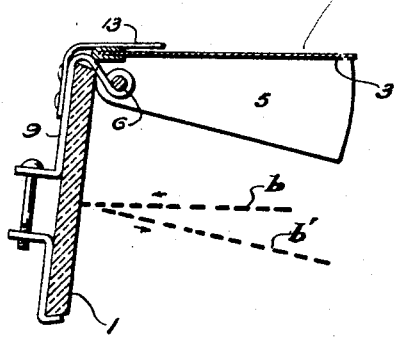
Fig. 8 is a similar view with the screen arranged in its inoperative position.

In Fig. 3 is clearly illustrated the action of the device when the screen 3 is in functional position, and in this view the broken line $a$ represents the light falling upon the screen 3, a portion of which may be and preferably is reflected upwardly away from the driver, as shown by the broken line $a'$, while that portion of the light which is neither reflected nor absorbed by the screen 3, is reflected by the mirror 1 to the driver's eyes, as indicated by the broken line $a^2$. When the screen 3 is moved to inoperative position, the entire intensity of light is represented by the heavier broken line $b$, as reflected by the line $b'$. This is more clearly illustrated in Fig. 8 wherein the glare shield 3 is elevated to an inoperative position and the light ray, indicated by $b$, is reflected at almost its full intensity, as indicated by the dotted line $b'$. From Figs. 6 and 7 the diverted, reflected light ray, indicated by the dotted line $a'$, is reflected upwardly away from the driver's eyes while the portion passing through the glare shield is reflected with a diminished intensity, as indicated by the lighter dotted line $a^2$.

It will be observed that this type of screen and its associated parts is adapted for detachable connection to any well known type of mirror.

I claim:—

1. A mirror device for vehicles comprising a mirror; a semi-reflecting screen normally positioned in front of said mirror at an angle thereto; a hinged connection between the upper edges of said mirror and screen whereby the latter may be swung upwardly away from said normal functional position; and wall members carried by the screen and movable therewith for limiting its movement into normal functional position, and when in said latter position affording a wall connection between the ends of the mirror and screen.

2. A mirror device for vehicles comprising a mirror; a semi-reflecting screen normally positioned in front of said mirror at an angle thereto; a hinged connection between the upper edges of said mirror and screen whereby the latter may be swung upwardly away from said normal functional position; wall members carried by the screen and movable therewith for limiting its movement into normal functional position, and when in said latter position affording a wall connection between the ends of the mirror and screen; and spring members for releasably retaining said screen in its normal functional or inoperative positions.

3. A mirror device for vehicles comprising a mirror; a semi-reflecting screen normally positioned in front of said mirror at an angle thereto; a hinged connection between the upper edges of said mirror and screen whereby the latter may be swung upwardly away from said normal functional position; wall members carried by the screen and movable therewith for limiting its movement into normal functional position, and when in said latter position affording a wall connection between the ends of the mirror and screen; spring members for releasably retaining said screen in its normal functional or inoperative positions, and bracket members mounting the screen and detachably secured to the mirror.

4. A mirror device for vehicles comprising a mirror; a semi-reflecting screen normally positioned in front of said mirror at an angle thereto; a rectangular frame mounting said screen; bracket members detachably engaging the mirror; pivotal connections between the bracket members and frame whereby the screen may be swung upwardly away from normal functional position and stop means for limiting the screen movement into normal functional position angularly of the mirror.

5. A mirror device for vehicles comprising a mirror; a semi-reflecting screen normally positioned in front of said mirror at an angle thereto; a rectangular frame mounting said screen; bracket members detachably engaging the mirror; pivotal connections between the bracket members and frame whereby the screen may be swung upwardly away from normal functional position; yieldable means carried by the bracket members and cooperating with the frame for retaining the screen either in normal functional or raised positions and stop means for limiting the screen movement into normal functional position angularly of the mirror.

6. A mirror device for vehicles comprising a mirror; a semi-reflecting screen normally positioned in front of said mirror at an angle thereto; a rectangular frame mounting said screen; bracket members detachably engaging the mirror; pivotal connections between the bracket members and frame whereby the screen may be swung upwardly away from normal functional position; and wall members extended at right angles from the frame ends for contacting with the mirror for limiting the screen movement into normal functional position, said wall members affording a wall connection between the screen and mirror.

7. An attachment for vehicle mirrors comprising a semi-reflecting and light absorbing screen; a pair of adjustable clamp devices for detachably engaging a vehicle mirror; a frame mounting said screen; a pivotal connection between said clamp devices and frame; and end wall members extending in parallel relation at right angles to said light absorbing screen, said walls being substantially triangular in plan and affording end wall connections between the screen and mirror when said screen is in normal functional position.

8. A rear view mirror for vehicles comprising a reflector, means adjustably supporting the same, a semi-reflecting screen normally positioned in front of said reflector at a downwardly divergent angle thereto, a hinged connection between the reflector and screen whereby the latter may be swung to and from its normal position across the reflector, and means limiting the pivotal movement of the screen toward the reflector to support said screen at an angle to the face of said reflector whereby a portion of the light ray directed toward the screen and reflector will be reflected by said screen from passing therethrough to the reflector and at an angle away from the light ray reflected by said reflector.

9. A rear view mirror for vehicles comprising a mirror, a semi-reflecting screen normally positioned in front of said mirror at an angle thereto, a rectangular frame for mounting said screen provided with fulcrum portions at the top sides thereof, bracket members for engaging said mirror provided with extending leaf springs and with pivot members extending over the top of said mirror, and means for pivotally mounting said fulcrum portions in said pivot members with said springs yieldably engaging and acting to maintain said frame in said normal position, said springs upon the pivoting of said frame on said pivot members away from said mirror yielding and acting to maintain said frame in such inoperative position.

10. A rear view mirror for vehicles comprising a reflector, a partially reflective transparent glare shield, and means for supporting the glare shield over the front of the reflector in an operative position, said glare shield when in its operative position being out of parallelism with the reflector and substantially co-extensive therewith, the front surface of said glare shield possessing light ray reflecting qualities and serving to direct its reflected light rays away from the eyes of the driver, by reason of the angular relationship between the glare shield and the reflector.

11. A rear view mirror for vehicles comprising a reflector, a partially reflective transparent glare shield, means supporting the glare shield for movement to and from an operative position across the reflector from and to an inoperative position clear of the reflector, and means carried by one of the first two-named elements for supporting and limiting the position of the glare shield at a downwardly divergent angle to the reflector whereby the reflections from the glare shield will be above the reflections from the reflector when the glare shield is operatively related to said reflector.

In testimony whereof I have signed my name to this specification.

GEORGE N. HEIN.